May 9, 1967
M. G. STRAUSS
3,319,083
UNIVIBRATOR CIRCUIT FOR DETECTING THE TIME
OCCURRENCE OF INPUT PULSES THERETO
Filed July 21, 1964
2 Sheets-Sheet 1
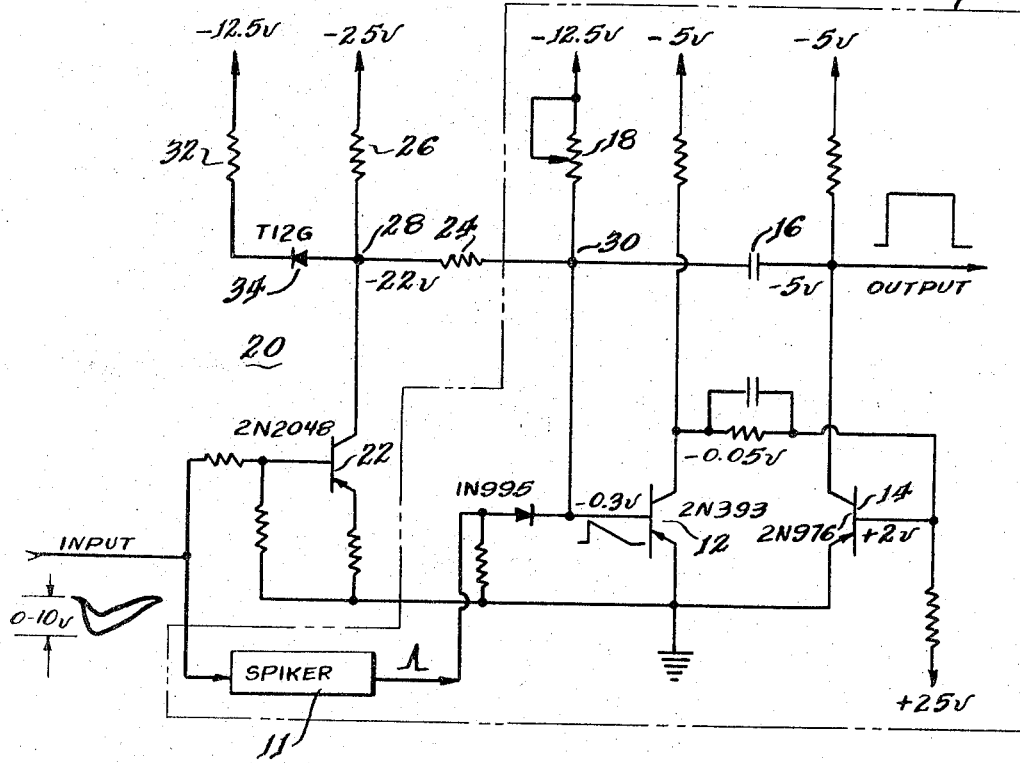
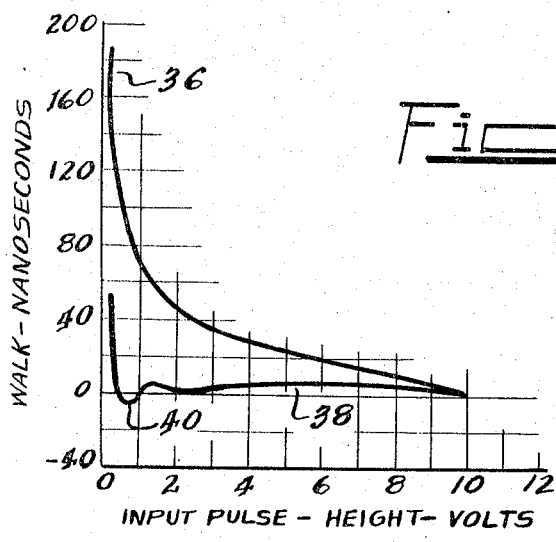
INVENTOR.
Michael G. Strauss
BY
Roland A. Anderson
Attorney United States Patent Office 3,319,083
Patented May 9, 1967

3,319,083
UNIVIBRATOR CIRCUIT FOR DETECTING THE TIME OCCURRENCE OF INPUT PULSES THERETO
Michael G. Strauss, Park Forest, Ill., assignor to the United States of America as represented by the United States Atomic Energy Commission
Filed July 21, 1964, Ser. No. 384,270
4 Claims. (Cl. 307—88.5)

ABSTRACT OF THE DISCLOSURE

A single-stage transistor amplifier is added to a transistor univibrator to provide an apparatus that generates responsive to an applied input pulse a time reference signal which is independent of the amplitude of the applied input pulse.

*Contractual origin of the invention*

The invention described herein was made in the course of, or under, a contract with the United States Atomic Energy Commission.

The present invention relates to circuits for detecting the time occurrence of pulses and more particularly to discriminator circuits used for such purposes.

In nuclear spectroscopy it is frequently necessary to determine accurately the amplitude as well as the time of arrival of signals from radiation detectors. In order to obtain good energy resolution, the charge released by the detector must be integrated before the pulse-height is measured. Such integrated signals have a risetime proportional to the decay time of the detector current pulse. When such pulses are timed with a discriminator, amplitude-dependent errors occur due to the fact that the trigger time of a discriminator with finite bias is dependent upon the amplitude of the input pulse. A large amplitude pulse will trigger the discriminator earlier than a small amplitude pulse, resulting in a maximum timing error equal to the risetime of the signal. The slower the detector the larger this error will be. In general, the prior art in effecting compensation for this error requires complex circuitry.

It is one object of the present invention to provide an improved device for detecting the time occurrence of input pulses applied thereto.

It is another object of the present invention to provide an improved univibrator circuit for detecting the time occurrence of input pulses applied thereto.

It is yet another object of the present invention to provide a device for detecting the time occurrence of input pulses applied thereto relatively independent of amplitude variations in such pulses.

Other objects will become more apparent as the detailed description proceeds.

In general the present invention comprises the addition of a single-stage transistor amplifier to a transistor univibrator used to detect the time occurrence of input pulses applied thereto.

Further understanding may best be obtained from consideration of the accompanying drawings wherein:

FIG. 1 is an electrical schematic of the present invention.

FIG. 4 is an error plot for the univibrator circuit of FIG. 1, both compensated and uncompensated.

The circuit of the present invention is schematically shown in FIG. 1. The portion of the circuit shown in dotted lines is a conventional uncompensated univibrator circuit 10 which is used to detect the time occurrence of input pulses applied thereto via a spiker 11. The biasing and supply voltages shown in FIG. 1 are merely representative for the purposes of description. To facilitate understanding of the present invention, a brief description of the operation of the conventional uncompensated univibrator circuit 10 will be given.

Figure 2:
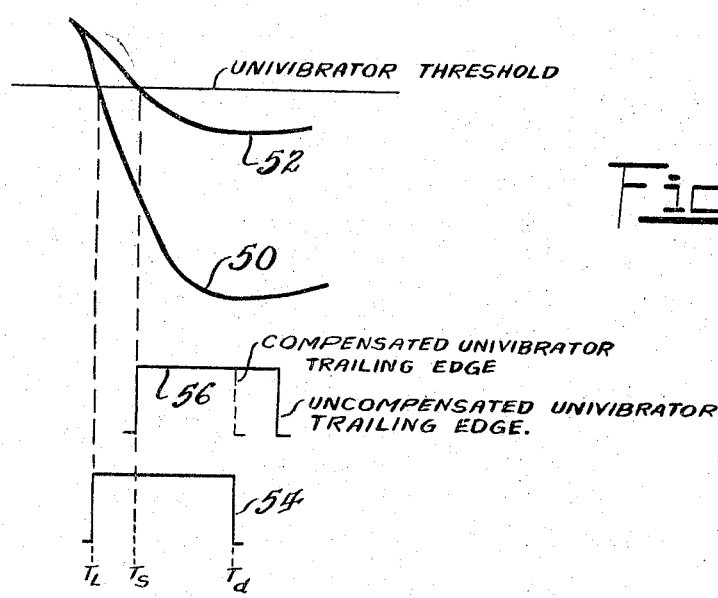
FIG. 2 is a graphical representation of the output of the univibrator circuit of FIG. 1, both compensated and uncompensated, for different amplitude input pulses.

The univibrator circuit 10 comprises two transistors 12 and 14. If a pulse is applied to univibrator circuit 10, the circuit is triggered, causing the capacitor 16 to discharge and give an output pulse. For a large amplitude pulse, the time of triggering of the univibrator will be close in time to the point of origin of the pulse. For a small amplitude pulse the time of triggering will be some finite time delayed from the point of origin. Since the discharge of capacitor 16 is dependent only upon the product of resistor 18 and capacitor 16, the duration of the output for both small and large amplitude input pulses is the same. Thus, a timing error occurs due to varying amplitudes of the input pulses, the smaller the input pulse the larger the timing error. This relationship for the uncompensated univibrator circuit 10 is graphically illustrated in FIG. 2. $T_L$ and $T_S$ are the times of triggering of the univibrator circuit 10 by large and small amplitude pulses 50 and 52, respectively. Square pulses 54 and 56 represent the outputs of the univibrator responsive to large and small amplitude input pulses 50 and 52, respectively.

The present invention comprises the addition of a one-stage transistor amplifier 20 to the above-described univibrator circuit 10. The collector of a transistor 22 of amplifier 20 is connected through a resistor 24 to the capacitor 16 of the univibrator. The base of the transistor 22 is resistively coupled to the input of the univibrator circuit 10 and connected with the emitter of transistor 22 to provide suitable biasing therefor and permit the conduction of transistor 22 responsive to input pulses applied to the base thereof. As previously described, the output pulse width of the univibrator circuit 10 is partially governed by the product of resistor 18 and capacitor 16, resistor 18 determining the rate at which capacitor 16 is discharged. The end of the discharge process marks the trailing edge of the output pulse from the univibrator circuit 10. With the addition of the amplifier 20, the discharge rate is now determined by resistors 24 and 18. The transistor 22 is normally not conducting, its collector voltage being determined by the resistive divider composed of resistors 24 and 26. When a large amplitude pulse is applied to the univibrator circuit as modified by the present invention, the univibrator circuit is triggered as hereinbefore described and capacitor 16 commences to discharge. However, a voltage pulse appears on the collector of the transistor 22 proportional to the amplitude of the input pulse. For a large amplitude input pulse, this voltage will be large and will raise junction point 28 to a potential approaching that of junction point 30, whereby the potential drop across resistor 24 is small and the bleeding current of capacitor 16 therethrough is small. Thus, for a large amplitude input pulse, the duration of the output pulse of the compensated univibrator circuit is quite similar to that of the uncompensated circuit 10 as hereinbefore described. When a small amplitude input pulse is applied to the compensated circuit of FIG. 1, the univibrator circuit 10 is triggered and capacitor 16 commences to discharge. The voltage pulse appearing on the collector of transistor 22 is small and hence the potential of junction point 28 pproaches the bias voltage of −22 volts. Resistor 24 thus has an appreciable potential drop thereacross and the bleeding current of capacitor 16 flowing therethrough becomes large. Thus, capacitor 16 discharges more rapidly for a small amplitude input pulse than for a large amplitude input pulse. This is graphically illustrated in FIG. 2 to show how capacitor 16 is caused to discharge at variable time rates dependent upon the amplitude of the input pulses, whereby an accurate time reference signal $T_d$ may be obtained for such input pulses to accurately portray the generation time thereof. Thus, the output pulse from the compensated univibrator circuit will always end at the same time independent of the amplitude of the input pulse.

Figure 3:
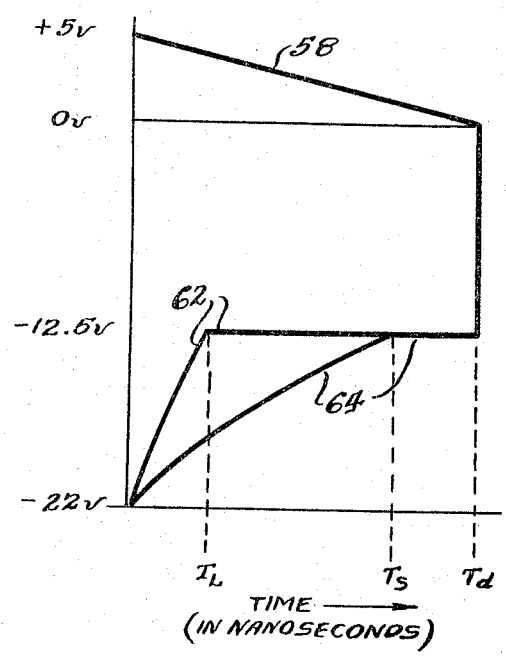
FIG. 3 is a graphical representation of transistor collector voltage variations with respect to input amplitude and time for the circuit of FIG. 1.

As previously stated, the potential drop across resistor 24 is equal to the difference between the collector voltage of transistor 22 and the base voltage of transistor 12. FIG. 3 shows how this potential drop varies as a function of the input pulse amplitude when resistor 32 has a value of zero ohms. Curve 58 is a plot of the base voltage of transistor 12 in FIG. 1 with respect to time as input pulses are applied thereto. Curves 62 and 64 are plots of the collector voltage of transistor 22 in FIG. 1 with respect to time for large and small amplitude input pulses, respectively. The time at which the collector of transistor 22 is clamped to the −12.5-volt supply depends upon the input pulse height in the same way the univibrator start time depends on the input pulse height. With a linear rise of the collector voltage of transistor 22, it can be seen from FIG. 3 that the compensating current through resistor 24 during the "on time" of the univibrator varies linearly with the time that the collector voltage of transistor 22 reaches the clamp potential. A small amplitude input pulse, which causes the collector voltage of transistor 22 to reach the clamp voltage late ($T_s$), will generate a larger compensating current than the large amplitude input pulse for which the collector voltage of transistor 22 is clamped earlier ($T_L$). With a linear discharge of capacitor 16, the width of the univibrator output pulse varies inversely with the discharge current to produce short time duration output pulses for small amplitude input pulses and long duration output pulses for large amplitude input pulses. Thus, the amplitude-dependent timing errors of the univibrator output are corrected at the trailing edge of the pulses by the same process as they are generated at the leading edge.

The aforementioned explanation included several assumptions. The collector voltage waveform of transistor 22 was assumed to rise linearly for all inputs, whereas actually it rises exponentially for small amplitude input pulses but approaches a linear rise for large amplitude input pulses. This departure from linearity tends to make the bleeding current of capacitor 16 for large amplitude input pulses too high relative to that for small amplitude input pulses. Further, the assumption that the bleeding current changes linearly with the time the collector voltage of transistor 22 reaches the clamp potential is true only if the width of the output pulse remains constant. Since the output pulse of the univibrator for large amplitude input pulses is wider than for small amplitude input pulses, the bleeding current for large input pulses is not proportional. The discharge of capacitor 16, which is not quite linear, tends to compensate for the aforementioned errors in the duration of the output pulses. To further correct for these errors, resistor 32 is inserted in series with a catching diode 34 to lower the clamp potential as a function of the input pulse amplitude. For large amplitude input pulses the clamp potential will be more positive than the −12.5 volts hereinbefore described, thereby decreasing the potential drop across resistor 24 and reducing the compensating current so as to make the time duration of the output pulse greater and compensate for the aforementioned nonlinearities.

FIG. 4 graphically illustrates the improvement of the compensating univibrator circuit according to the present invention. The term "walk" as used in the ordinate of FIG. 4 is hereby defined as being equal to the timing error caused by different amplitudes in input pulses to the univibrator. Curve 36 represents the performance of the uncompensated univibrator circuit 10 and curve 38 represents the performance of the compensated univibrator circuit according to the present invention. The improvement accomplished by the addition of a single transistor amplifier to the univibrator circuit 10 is clearly evident. For input pulses ranging from 0.5 to 10 volts in amplitude, the walk of the uncompensated univibrator circuit 10 is 100 nanoseconds, whereas the walk for the compensated univibrator circuit for the same input pulse heights is less than 10 nanoseconds. The increase in walk at the high and low ends of the dynamic range is due to design limitations. The time at which the collector of transistor 22 reaches the clamp potential depends upon the input pulse height as well as on the inherent risetime of the compensating amplifier stage 20. Input pulses for which the collector of transistor 22 does not reach the clamp potential during the on time of the univibrator tend to produce output pulses therefor which are too short, as shown in FIG. 4 by the valley 40. The sharp increase in the walk for very small amplitude input pulses is due to transistor 22 not conducting until the amplitude input is approximately 0.3 volt. The measurements for curves 36 and 38 of FIG. 4 were made with pulse generator pulses which rise (10 to 90%) in 0.5 microsecond. When the univibrator circuit is used with inputs which have a different risetime, the compensation range must be changed. This may be accomplished by changing resistor 24 in value, but may be more readily done by changing the value of risistor 18.

Persons skilled in the art will, of course, readily adapt the teachings of the present invention to embodiments far different than the embodiment illustrated. Accordingly, the scope of the protection afforded the invention should not be limited to the particular embodiment shown in the drawings and described above but shall be determined only in accordance with the appended claims.

What is claimed is:

1. In an electronic device comprising a transistor univibrator circuit having a timing capacitor therein and which is used to detect the time occurrence of input pulses applied thereto, means for generating a voltage proportional in amplitude to the amplitude of said applied pulses, and means for applying said generated voltage to cause said timing capacitor of said univibrator circuit to discharge in a time duration proportional to the amplitude of said input pulses whereby an accurate time measurement of the occurrence of said input pulses is provided.

2. In a transistor univibrator circuit having a timing capacitor therein and which is used to detect the time occurrence of input pulses applied thereto, the combination with a single-stage transistor amplifier connected to cause the collector output thereof to be responsive to the amplitude of said input pulses, means for clamping the collector output of said amplifier at a predetermined voltage responsive to conduction thereof, a resistor, means for connecting the collector of said transistor amplifier through said resistor to said timing capacitor whereby said timing capacitor discharges in a time duration proportional to the amplitude of said input pulses to provide an accurate time measurement of the occurrence of said input pulses.

3. The device according to claim 2 wherein said clamping means comprise a voltage supply, a diode, means for connecting the anode of said diode to said voltage supply and means for connecting the cathode of said diode to the collector of said amplifier.

4. In a transistor univibrator circuit having a timing capacitor therein and which is used to detect the time occurrence of input pulses applied thereto, the combination with a transistor having a base, a collector and an emitter; means for connecting the base of said transistor to the input of said univibrator; a first voltage supply; means for connecting the collector of said transistor to said first voltage supply; a resistor; means for connecting the collector of said transistor through said resistor to said timing capacitor; a second voltage supply; a diode; means for connecting said second voltage supply through said diode to the collector of said transistor; and means for biasing the base of said transistor with respect to the emitter thereof to permit the conduction of said transistor responsive to input pulses applied to said base.

References Cited by the Examiner

UNITED STATES PATENTS 3,040,185  6/1962  Horton _____ 307—88.5
3,087,393  12/1962  Murray _____ 328—66 X

OTHER REFERENCES

Johansson: Nuclear Inst. vol. I, pp. 274–279, September 1957.

References Cited by the Applicant

P. Weinzierl: Rev. Sci. Instr. 27, 226 (1956).

J. F. Draper and A. A. Fleischer: Rev. Sci. Instr. 31, 49 (1960).

E. Fairstein: "A Pulse Crossover Pickoff Gate for Use with a Medium-Speed Coincidence Circuit," Oak Ridge National Laboratory Report, ORNL–2480 (1958).

W. Gruhl, Proc. Int. Symp. on Nuclear Electronics, I, 189 (Paris 1958).

P. R. Orman: Nuclear Instr. and Meth., 21, 121 (1963).

ROY LAKE, *Primary Examiner.*

ALFRED L. BRODY, *Examiner.*